United States Patent [19]

Watanabe et al.

[11] Patent Number: 4,805,032
[45] Date of Patent: Feb. 14, 1989

[54] TOTAL CONTACT TYPE PHOTOELECTRIC CONVERSION DEVICE AND OPTICAL READER USING THE SAME

[75] Inventors: Yoshio Watanabe, Kawasaki; Hiroyuki Horiguchi; Masanori Itagaki, both of Yokohama, all of Japan

[73] Assignee: Ricoh Company, Ltd., Tokyo, Japan

[21] Appl. No.: 181,574

[22] Filed: Apr. 14, 1988

[30] Foreign Application Priority Data

| Apr. 20, 1987 | [JP] | Japan | 62-98444 |
| Apr. 20, 1987 | [JP] | Japan | 62-98445 |
| Apr. 24, 1987 | [JP] | Japan | 62-102566 |
| Apr. 30, 1987 | [JP] | Japan | 62-107053 |

[51] Int. Cl.$^4$ .............................................. H04N 1/12
[52] U.S. Cl. ................................... 358/294; 358/293
[58] Field of Search ................................. 358/294, 293

[56] References Cited

U.S. PATENT DOCUMENTS

| 4,686,581 | 8/1987 | Spehrley | 358/294 |
| 4,691,243 | 9/1987 | Cannella | 358/294 |
| 4,707,747 | 11/1987 | Rockwell | 358/294 |
| 4,716,456 | 12/1987 | Hosaka | 258/294 |
| 4,725,890 | 2/1988 | Yaniv | 358/294 |

FOREIGN PATENT DOCUMENTS

| 47-3482 | 1/1972 | Japan . |
| 55-44470 | 11/1980 | Japan . |
| 58-46182 | 10/1983 | Japan . |
| 59-122274 | 7/1984 | Japan . |

Primary Examiner—Howard W. Britton
Attorney, Agent, or Firm—Oblon, Fisher, Spivak, McClelland & Maier

[57] ABSTRACT

A total contact type photoelectric conversion device comprises a substrate having an optically transparent portion, a plurality of photoelectric conversion elements formed in a line on the substrate, and a cover layer covering the plurality of the photoelectric conversion elements and having a roller load region within which the cover layer is to make contact with a sheet partially wrapped around a peripheral surface of a roller for feeding the sheet in a sub-scanning direction. The plurality of photoelectric conversion elements are aligned in a main scanning direction perpendicular to the sub-scanning direction and are located outside the roller load region. Therefore, incident light passing through the device is reflected on a position on the sheet outside the roller load region.

18 Claims, 7 Drawing Sheets

TOTAL CONTACT TYPE PHOTOELECTRIC CONVERSION DEVICE AND OPTICAL READER USING THE SAME

BACKGROUND OF THE INVENTION

The present invention generally relates to a total contact type photoelectric conversion device and an optical reader using the same, and in particular to a total contact type photoelectric conversion device in which a sheet of paper or the like to be optically scanned is made to slide on the photoelectric conversion device during the scan, and an optical reader using the same. The present invention can be suitably applied to a facsimile machine, a digital copying machine, a digital color copying machine, an optical character reading apparatus, an electronic blackboard and the like.

In general, a total contact type photoelectric conversion device, which is also referred to as a total contact type image sensor, employs a glass plate as a transparent sensor protecting layer. In a conventional optical reader utilizing the total contact type image sensor, a roller for feeding paper to be scanned is positioned so as to make contact with the sensor protecting layer of the image sensor. Paper is wrapped around a part of a peripheral surface of the roller and is made to slide on the sensor protecting layer of the image sensor in a sub-scanning direction. In general, the image sensor has a transparent window and photoelectric conversion elements which are aligned in a main scanning direction. These constituents covered by the transparent sensor protecting layer are positioned under a portion thereof to which a load of the roller is applied. In other words, an optical path region of the image sensor is positioned in a roller load region. Therefore, when the transparent protecting layer is damaged and/or worn away due to the sliding of the paper thereon, there occur problems of a decrease in quantity of light received by the photoelectric conversion elements and a decrease in the modulation transfer function of the image sensor (hereafter simply referred to as MTF).

In order to solve the above problems, conventionally, a transparent wear-resistant layer is formed on the transparent protecting layer. However flaws are introduced in the wear-resistant layer after long-term use, and therefore causes light to be scattered. As a result, the MTF is decreased as in the former image sensor. Additionally, the wear-resistant layer must be transparent and hard. This requirement decreases the degree of flexibility of selecting material for the wear-resistant layer.

FIG. 1 shows an essential part of a conventional total contact type image sensor 30 together with a part of a paper feed roller 10. A sheet of paper to be scanned is partially wrapped around a part of a peripheral surface of the roller 10. The image sensor 30 comprises optically transparent substrate 31, a light screening layer 32, a transparent window 33, a transparent insulating layer 34, photoelectric conversion elements 35, a transparent protecting layer 36 and a transparent wear-resistant layer 37.

The light screening layer 32 is formed on the transparent substrate 31 and is made of an optically opaque and electrically poor conductor. The transparent window 33 is formed in the light screening layer 32 and is used for illuminating the paper 20. The transparent insulating layer 34 is formed on the light screening layer 32 and is filled into the transparent window 33. The photoelectric conversion elements 35 are formed on the transparent insulating layer 34 and are aligned in a main scanning direction parallel to an axial direction of the roller 10. The transparent protecting layer 36 is used for protecting the aligned photoelectric conversion elements 35. The wear-resistant layer 37 is formed on the transparent protecting layer 36 and is used for protecting the transparent protecting layer 36.

Incident light L which enters into the image sensor 30, passes through the transparent substrate 31, the transparent window 33 in the light screening layer 32, the transparent insulating layer 34, the transparent protecting layer 36 and the transparent wear-resistant layer 37, and is reflected on the surface of the sheet of paper 20. The reflected light passes through the transparent wear-resistant layer 37 and the transparent protecting layer 36, and a part of the incident light L reaches the photoelectric conversion element 35, at which the part of the light L is converted to an electric output signal. The paper 20 fed by the roller 10 in a direction of an arrow is pressed on the image sensor 30 within a range I due to the load of the roller 10. This range I is hereafter referred to as a roller load region. In general, a reflection point on the paper is designed to be located at a maximum roller load position which corresponds to an intersection between the paper 20 and a plane passing through the axis of the roller 10 and is perpendicular to the transparent substrate 31. Therefore, the transparent window 33 and the photoelectric conversion elements 35 are positioned within the roller load region I.

The transparent wear-resistant layer 37 is formed in order to prevent the transparent protecting layer 36 from being worn away due to the sliding of the paper 20. A material suitable for the transparent wear-resistant layer 37 must be transparent and hard. However, there is no material for completely satisfying the above requirements. Flaws on the surface of the transparent wear-resistant layer 37 and abrasion thereof cause a decrease in the quantity of light which reach the photoelectric conversion elements 35 and degrades the MTF of the image sensor. Hence, the conventional image sensor cannot stand long-term use.

Additionally, an air gap formed between the paper 20 and the surface of the transparent wear-resistant layer 37 is of the order of approximately 10 μm, which corresponds to the roughness of paper. For this reason, conventionally, the transparent protecting layer 36 must be formed so L as to have a thickness of 70 to 100 μm which is considerably greater than the thickness of the air gap. As a result, the value of the MTF of the conventional image sensor is approximately 0.5 at most.

FIG. 2 shows another conventional photoelectric conversion image sensor 30a together with the part of the roller 20. The illustrated image sensor 30a comprises the transparent substrate 31, the light screening layer 32, the transparent window 33, the transparent insulating layer 34, a transparent passivation layer 38, an adhesive layer 39, the transparent protecting layer 36 and the transparent wear-resistant layer 37. The transparent passivation layer 38 made of silicon dioxide ($SiO_2$), silicon oxynitride (SiON), silicon nitride ($Si_3N_4$) and so on is formed on the transparent insulating layer 34 and the photoelectric conversion elements 35. The transparent protecting layer 36 is a glass plate, which is secured on the passivation layer 38 by the adhesive layer 39. The transparent wear-resistant layer 37 is made of $Si_3N_4$.

The incident light L passes through the layers and is reflected on the sheet 20. The reflected light enters the image sensor and reaches the photoelectric conversion elements 35. Because the incident light L and the reflected light are scattered and attenuated, only a part of the incident light L reaches the photoelectric conversion elements 35.

The wear-resistant layer 37 made of $Si_3N_4$ has a refractive index of approximately 2.0. The transparent protecting layer 36 of the glass plate has a refractive index of approximately 1.6. The air gap of approximately 10 $\mu$m between the wear-resistant layer 37 add the paper 20 has a refractive index of approximately 1.0. It is noted that the refractive index of the air gap is much lower than that of the transparent wear-resistant layer of silicon nitride. This results in an increase of light which is reflected at boundary surfaces between the air gap and the transparent wear-resistant layer 37 and therefore decreases the MTF. Additionally, a great difference in the refractive index between adjacent layers increases the quantity of light reflected at the boundary surfaces therebetween.

FIG. 3 is a view for explaining the above problems. In FIG. 3, a reference numeral 40 denotes an air gap or layer formed between the paper 20 and the transparent wear-resistant layer 37. The refractive indexes of the air layer 40, the wear-resistant layer 37 and the transparent protecting layer 36 are denoted by $n_1$, $n_2$ and $n_3$, respectively. With this layer structure, the following relationship can be obtained in accordance with Fresnel's formula:

$$\beta = I_1/I_0$$
$$= [4n_1n_2/(n_1 + n_2)^2][4n_2n_3/(n_2 + n_3)^2]$$

where $I_0$ denotes the quantity of a light component entering the transparent protecting layer 36, and $I_1$ denotes the quantity of a light component reaching the paper 20. A difference between $I_0$ and $I_1$ corresponds to the quantity of light components $I_2$ reflected at the boundary surfaces.

FIG. 4 is a graph of $\beta$ vs. the refractive index $n_2$ of the wear-resistant layer 37 when $n_1 = 1.0$ and $n_3 = 1.5$. It can be seen from the graph that an optimum value of the refractive index $n_2$ is approximately 1.25, and in this case a value of $\beta$ equal to 0.98 is obtainable. This means that only 2% of the incident light is reflected on the boundary surfaces between adjacent layers including the air layer. When $n_2 = 2.0$, $\beta$ is equal to 0.87, and therefore more than 13% of the incident light is reflected on the boundary surfaces between the layers. That is, the light components $I_2$ are increased and thereby the MTF is decreased by about 20%, compared to the case where $n_2 = 1.25$.

SUMMARY OF THE INVENTION

Accordingly, a general object of the present invention is to provide a novel and useful total contact type photoelectric conversion device in which the above disadvantages have been eliminated.

A more specific object of the present invention is to provide a total contact type photoelectric conversion device in which an increased degree of flexibility of selecting material used for forming a wear-resistant layer can be obtained.

Another object of the present invention is to provide a total contact type photoelectric conversion device which is hardly degraded after the long-term use.

Yet another object of the present invention is to provide a total contact type photoelectric conversion device which can provide an optimum and high MTF.

The above object of the present invention can be achieved by a substrate having an optically transparent portion; a plurality of photoelectric conversion elements formed in a line on the substrate; and a cover layer covering the plurality of the photoelectric conversion elements and having a roller load region within which the cover layer is to make contact with a sheet partially wrapped around a peripheral surface of a roller for feeding the sheet in a sub-scanning direction. The plurality of photoelectric conversion elements are aligned in a main scanning direction perpendicular to the sub-scanning direction and are located outside the roller load region, so that incident light passing through the device is reflected on a position on the sheet outside the roller load region.

A further object of the present invention is to provide a photoelectric conversion device in which the quantity of light components reflected on boundary surfaces between adjacent layers is decreased.

The above further object of the present invention can be provided by a photoelectric conversion device comprising a substrate having an optically transparent portion; a plurality of photoelectric conversion elements formed in a line on the substrate; a first cover layer for covering the plurality of photoelectric conversion elements; and a second cover layer deposited on the first cover layer. In addition, the following conditional expression is satisfied;

$|n_2 - (n_1 + n_3)/2| \leq 0.2$ where $n_1$ denotes a refractive index of an air layer adjacent to the second cover layer, $n_2$ denotes a refractive index of the second cover layer, and $n_3$ denotes a refractive index of the first cover layer.

A still further object of the present invention is to provide an optical reader comprising the total contact type photoelectric conversion device having the above advantageous features.

This still further object of the present invention can be provided by an optical reader comprising a total contact type photoelectric conversion device; a first roller for feeding a sheet on the photoelectric conversion device; and a second roller located so as to make contact with the first roller for drawing the sheet in a sheet transportating direction. The photoelectric conversion device comprises a substrate having an optically transparent portion; a plurality of photoelectric conversion elements formed in a line on the substrate; and a cover layer covering the plurality of the photoelectric conversion elements and having a roller load region within which the cover layer is to make contact with the sheet partially wrapped around a peripheral surface of the first roller. The plurality of photoelectric conversion elements are aligned in a main scanning direction parallel to axes of the first and second rollers and are located outside the roller load region, so that incident light passing through the devide is reflected on a position on the sheet outside the roller load region.

Other objects, features and advantages of the present invention will become apparent from the following detailed description when read in conjunction with the accompanying drawings.

DETAILED DESCRIPTION

A description is now given of a first preferable embodiment of a total contact type photoelectric conversion device according to the present invention.

Figure 5:
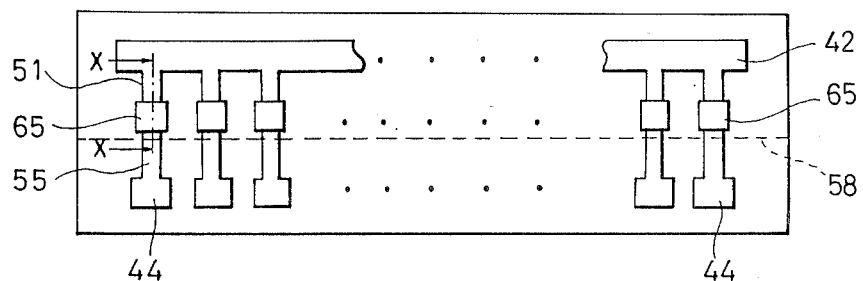
FIG. 5 is a plan view of embodiments of a total contact type photoelectric conversion device according to the present invention.
Figure 6:
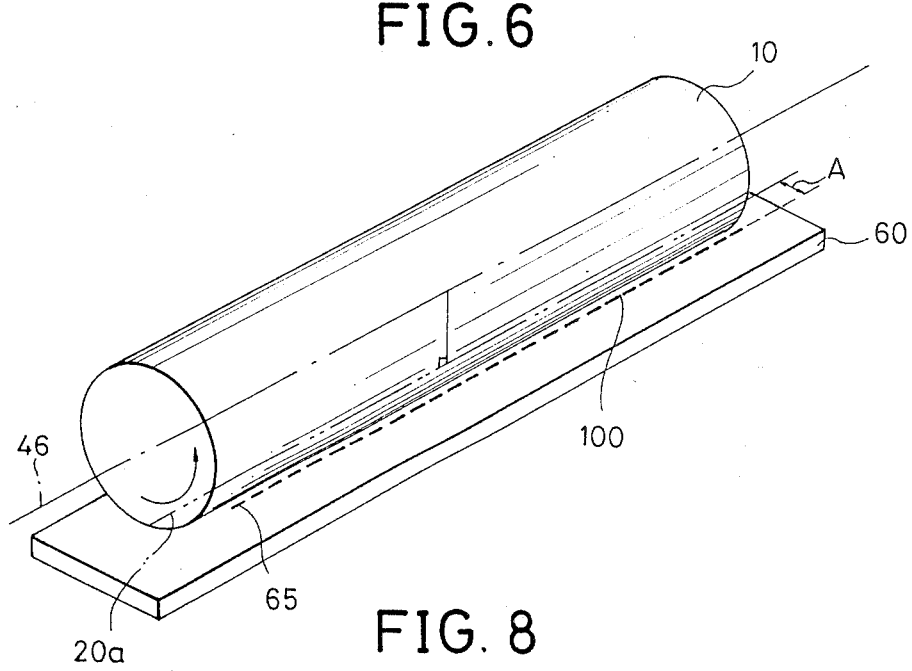
FIG. 6 is a perspective view for explaining a positional relationship between a paper feed roller and the photoelectric conversion device of the present invention.
Figure 7:
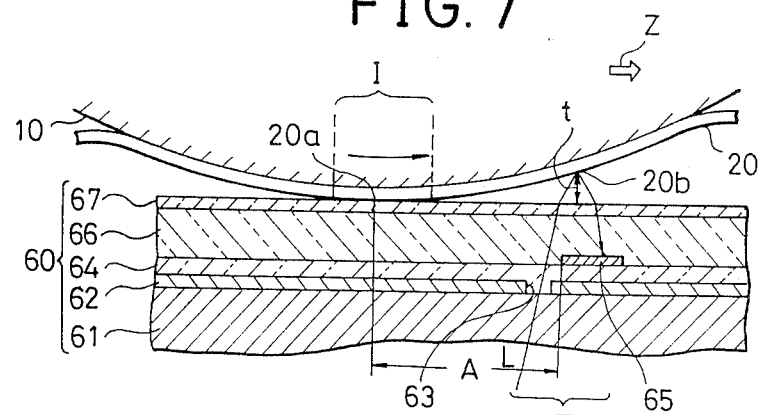
FIG. 7 is a cross sectional view of an essential part of a first embodiment of the photoelectric conversion device according to the present invention.

FIG. 5 is a plan view of the first preferable embodiment of the contact type photoelectric conversion device according to the present invention, FIG. 6 is a perspective view of an essential part of an optical reader utilizing the first embodiment, and FIG. 7 is a cross sectional view taken along a line X-X shown in FIG. 5.

In FIG. 7, a part of a cross section of a roller shown in FIG. 6 is shown together with the cross section of the essential part of the first embodiment.

As shown in FIG. 7, a total contact type photoelectric conversion device (also referred to as the total contact type image sensor as described previously) 60 comprises a transparent substrate 61, a light screening layer 62, a transparent window 63, a transparent insulating layer 64, photoelectric conversion elements 65, a transparent protecting layer 66 and a transparent wear-resistant layer 67. The light screening layer 62 is formed on the transparent substrate 61 made of a glass plate for example, and is made of an optically opaque. For example, the light screening layer 62 is a chromium (Cr) thin film which is vapor-deposited on the transparent substrate 61. The transparent window 63 formed in the light screening layer 62 is used for illuminating the paper 20. The transparent window 63 extends in the main scanning direction parallel to the direction of the axis of the roller 10. The transparent window 63 can be obtained by subjecting the Cr thin film deposited on the entire surface of the transparent substrate 61 to the photoetching process. The transparent insulating layer 64 made of $SiO_2$ or the like is formed on the light screening layer 62 and is filled into the transparent window 63. The photoelectric conversion elements 65 (a cross section of only one of the elements is illustrated in FIG. 7) is used for converting a light component reflected on the paper 20 to a corresponding electric signal. The photoelectric conversion elements 65 are aligned in the main scanning direction parallel to the axial direction of the roller 10. The transparent protecting layer 66 formed on the transparent insulating layer 64 and around the photoelectric conversion elements 65 is used for protecting the aligned photoelectric conversion elements 65. A detailed layer structure of each photoelectric conversion elements 65 will be described later. The transparent protecting layer 66 is made of $SiO_2$, SiON and the like. The transparent protecting layer 66 can be deposited on the transparent insulating film 64 and the photoelectric conversion elements 65 by plasma chemical vapor deposition (plasma CVD). The transparent wear-resistant layer 67 formed on the transparent protecting layer 66 is used for protecting the transparent protecting layer 66. Materials such as $Si_3N_4$, SiON, and $SiO_2$ can be used for forming the transparent wear-resistant layer 67. The deposition of the transparent wear-resistant layer 67 can be performed by the plasma CVD. Further, as described later, the transparent wear-resistant layer 67 may be a thin film containing boron (B), carbon (C), nitrogen (N) and hydrogen (H).

Figure 1:
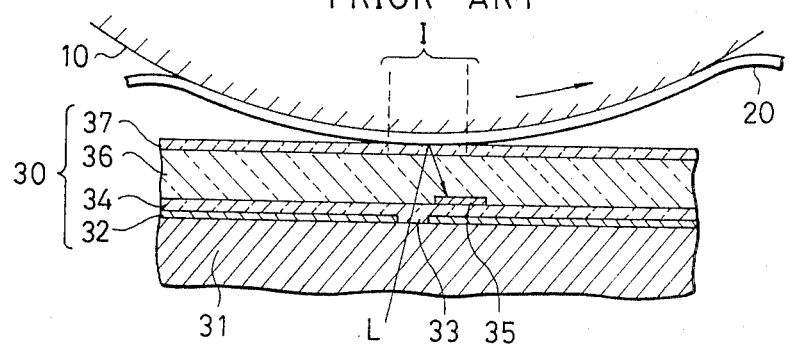
FIG. 1 is a cross sectional view showing an essential part of a conventional total contact type photoelectric conversion device together with a part of a roller for feeding a sheet of paper to be scanned.

The photoelectric conversion elements 65 are located outside the roller load region I in which the paper 20 is made to slide on the transparent wear-resistant layer 67 in a state where it is pressed thereon due to the load of the roller 10. In detail, each of the photoelectric conversion elements 65 are located at a distance A in the sub-scanning direction Z from a maximum load position 20a which corresponds to an intersection between the surface of the transparent wear-resistant layer 67 and a plane which passes through an axis 46 of the roller 10 (FIG. 6) and is perpendicular to the surface of the substrate 61. Correspondingly, the transparent window 63 is located outside the roller load region I. With the above location of the transparent window 63 and the photoelectric conversion elements 65, an optical path region II is also located outside the roller load region I. As a result, the incident light L which passes through the image sensor 60 is reflected on a reflection position 20b on the paper 20 which is also located outside the roller load region 20a. Therefore, a part of the surface of the transparent wear-resistant layer 67 above the transparent window 63 and the photoelectric conversion elements 65 is never damaged and is never worn away. As a result, the image sensor of the present invention can maintain the high MTF value after the long-term use thereof. In addition, the degree of flexibility of selecting material for the transparent wear-resistant layer 37 is increased. Moreover, a thickness t of the air gap or layer between the reflection position 20b and the surface of the transparent wear-resistant layer 67 is adjustable by changing the locations of the transparent window 63 and the photoelectric conversion elements 65 with respect to the maximum roller load position 20a. Therefore, an optimum and high value of the MTF can be obtained. In practice, the thickness t is adjustable within a range of 10 to 100 μm. Further, it becomes possible to make the transparent protecting layer 66 thinner than the transparent protecting layer 36 of the conventional image sensor of FIG. 1. It is enough for the transparent protecting layer 66 to have a thickness of approximately 3 to 10 μm.

Figure 8:
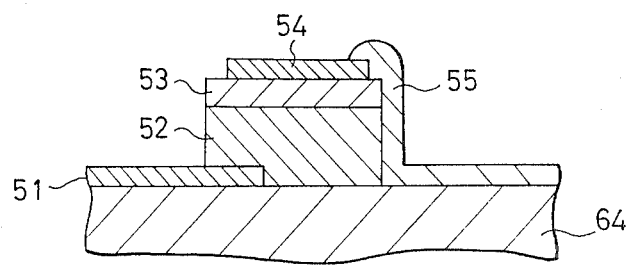
FIG. 8 is a cross sectional view of an essential part of a photoelectric conversion element.

FIG. 8 is a cross sectional view showing each of the photoelectric conversion elements 65. An electrode 51 made of Cr is deposited on the transparent insulating layer 64. An amorphous silicon layer 52 is deposited on the Cr electrode 51 and the transparent insulating layer 64. A silicon oxynitride (SiON) layer 53 is deposited on the amorphous silicon layer 52. An indium tin oxide (ITO) layer 54 is formed on the SiON layer 53. The ITO layer 54 may be formed directly on the amorphous silicon layer 52 without using the SiON layer 53. An electrode made of Al 55 extends from the ITO layer 54 along a side wall of the stacked layer structure, and is laid on the surface of the transparent insulating layer 64. The structure of FIG. 8 is coated by the protecting layer 66. The structure of FIG. 8 is only one example, and various structures of photoelectric conversion elements can be employed.

As shown in FIG. 5, the electrode 51 extending from each of the photoelectric conversion elements 65 is connected to a common electrode 42. The electrode 55 extending from each of the photoelectric conversion elements 65 is connected to a related bonding pad 44.

Figure 9:
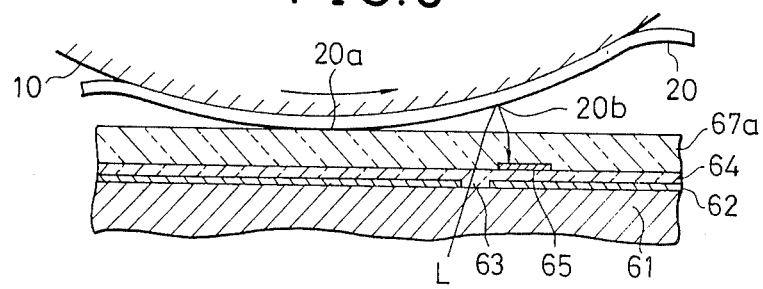
FIG. 9 is a cross sectional view of an essential part of a second embodiment of the present invention.

FIG. 9 is a cross sectional view of an essential part of a second embodiment of the total contact type image sensor according to the present invention. The cross section of the image sensor of FIG. 9 corresponds to the cross section taken along the line X-X in FIG. 5. In FIG. 9, reference numerals which are the same as those in the previous figures denote the same elements. In the second embodiment, a transparent wear-resistant layer 67a made of $Si_3N_4$ is formed directly on the transparent insulating layer 64 and the photoelectric conversion elements 65. The transparent wear-resistant layer 67a made of $Si_3N_4$ has both the functions of the transparent protecting layer 66 and the transparent wear-resistant layer 67. The wear-resistant layer 67a may be formed by depositing $Si_3N_4$ by means of the plasma CVD. It is sufficient for the $Si_3N_4$ wear-resistant layer 67a to have a thickness of 3 to 10 μm. The image sensor of FIG. 9 is simpler than that of FIG. 7. Additionally, the scattering and attenuation of the incident light L is decreased, compared to the the bilayer structure of FIG. 7. In contrast, the image sensor of FIG. 7 is mechanically stronger than that of FIG. 9.

Figure 10:
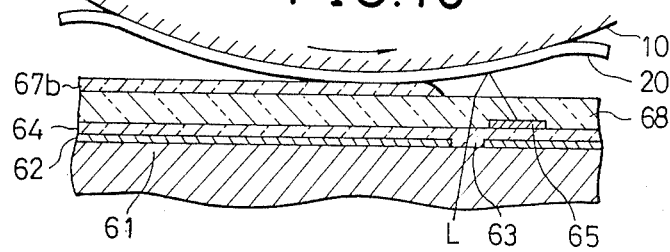
FIG. 10 is a cross sectional view of an essential part of a third embodiment of the present invention.

FIG. 10 is a cross sectional view of an essential part of a third embodiment of the present invention. The cross section of the image sensor of FIG. 10 corresponds to the cross section taken along the line X—X shown in FIG. 5. A transparent passivation layer 68 is formed on the entire surface of the transparent insulating layer 64 and around the photoelectric conversion elements 65. The passivation layer 68 is made of $Si_3N_4$, SiON, $SiO_2$ and the like and may be deposited by the plasma CVD. The passivation layer 68 has the same function as the transparent protecting layer 66. The thickness of the passivation layer 68 is in the range of 3 to 10 μm, for example. A wear-resistant film 67b is partially formed on the passivation layer 68 so as not to cover a part of the surface of the passivation layer 68 above the transparent window 63 and the photoelectric conversion elements 65. The paper 20 wrapped around the peripheral surface of the roller 10 is made to slide on the wear-resistant layer 67b. The wear-resistant layer 67b made of i-carbon (carbon having a diamond structure) is suitable for the third embodiment. The i-carbon film is harder than the silicon nitride film, and is hardly worn away due to the sliding action of the paper 10. It is noted that the i-carbon film is not optically transparent in general. According to the present invention, because the transparent window and the photoelectric conversion elements are located outside the roller load region I, it is allowable for opaque materials to be used as the wear-resistant layer 67b. Silicon carbide (SiC) may be also used in place of i-carbon. The wear-resistant layer 67b is approximately 1.0 μm in thickness. An edge of the wear-resistant layer 67b extending in the main scanning direction is shown by a broken line 58 in FIG. 5.

Figure 11A:
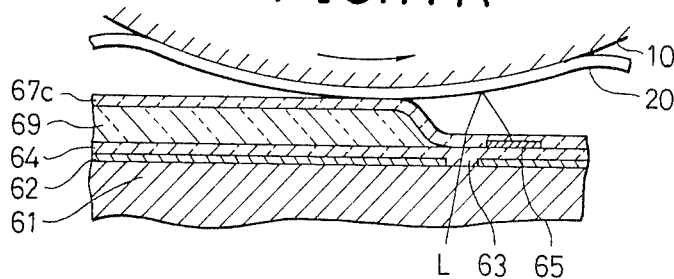
FIG. 11A is a cross sectional view of an essential part of a fourth embodiment of the present invention.

FIG. 11A is a cross sectional view of an essential part of a fourth embodiment of the image sensor according to the present invention. A resin layer 69 is partially formed on the transparent insulating layer 64 so that it does not cover the transparent window 63 and the aligned photoelectric conversion elements 65. For example, the resin layer 69 is formed by coating polyimide on the transparent insulating layer 64 by the screen printing. The resin layer 69 is 3 to 10 μm in thickness. A transparent wear-resistant layer 67c is formed on the resin layer 69 and an exposed portion of the surface of the transparent insulating layer 64. The transparent wear-resistant layer 67c is made of $Si_3N_4$. $Si_3N_4$ can be deposited by sputtering or the plasma CVD. The transparent wear-resistant layer 67c is approximately 1.0 μm in thickness. With the fourth embodiment of FIG. 11, the scattering and attenuation of the incident light L is further improved, compared to the structure shown in FIGS. 7 through 10. A stepped portion of the transparent wear-resistant layer 67c corresponds to the line 58 shown in FIG. 5.

Figure 11B:
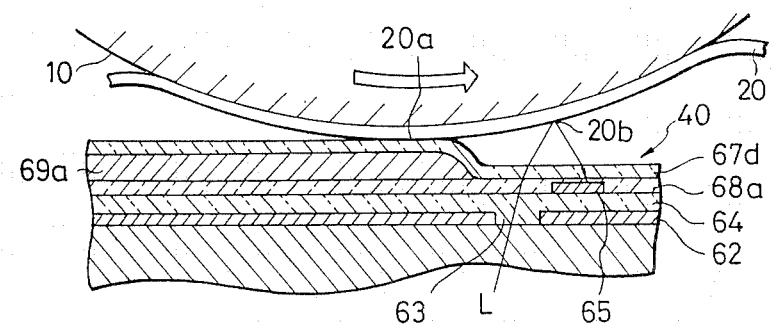
FIG. 11B is a cross sectional view of an essential part of a variation of the fourth embodiment of FIG. 11A.

FIG. 11B is a cross sectional view of an essential part of a variation of the image sensor shown in FIG. 11A. A transparent passivation layer 68a made of $Si_3N_4$, $SiO_2$, SiON and the like is formed on the insulating layer 64 and around the photoelectric conversion elements 65. A resin layer 69a made of polyimide for example is partially formed on the passivation layer 68a so as not to cover a part of the surface of the passivation layer 68a above the transparent window 63 and the photoelectric conversion elements 65. A transparent wear-resistant layer 67d made of $Si_3N_4$ is formed on the resin layer 69a and an exposed passivation surface portion. The paper 20 is made to slide on the transparent wear-resistant layer 67d. Compared to the structure of FIG. 11A, the paper 20 can be made to smoothly slide due to the presence of the silicon nitride layer 67d.

Figure 12:
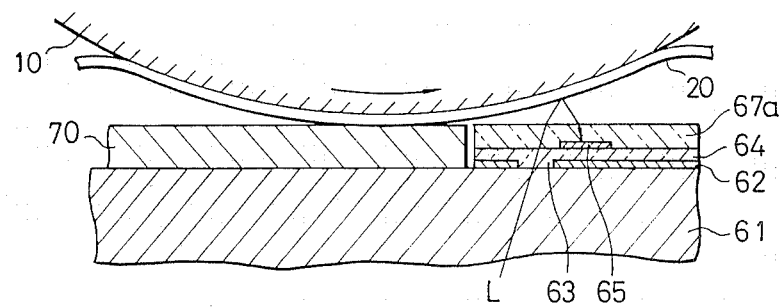
FIG. 12 is a cross sectional view of an essential part of a fifth embodiment of the present invention.

FIG. 12 is a cross sectional view of a fifth embodiment of the image sensor according to the present invention. A feature of the fifth embodiment is that a supporting plate 70 on which the paper 20 is made to slide, is mounted on the transparent substrate 61. That is, the roller load is exerted on the supporting plate 70. It is unnecessary for the supporting plate 70 to be optically transparent. The metallic plate 70 can be fixed to the upper surface of the transparent substrate 61 by an adhesive material. The supporting plate 70 is made of metallic material such as aluminum (Al) and stainless steel, plastics and the like. A stacked layer structure identical to that of FIG. 9 is formed close to the metallic plate 70. The height of the stacked layer structure mounted on the transparent substrate 61 is equal to the height of the supporting plate 70.

Figure 13:
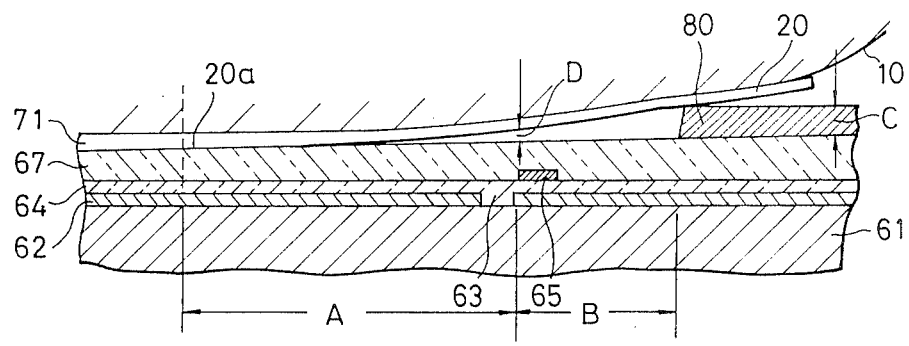
FIG. 13 is a cross sectional view of an essential part of a sixth embodiment of the present invention.

FIG. 13 is a cross sectional view of an essential part of a sixth embodiment of the image sensor according to the present invention. A feature of the sixth embodiment is the presence of a spacing member 80 mounted on the transparent wear-resistant layer 37. The spacing member 80 is intended to support the sheet of paper 20 so as to facilitate the contact between the sheet of paper 20 and the peripheral surface of the roller 10 so that the air gap or layer can be obtained with certainty between the image sensor and the sheet of paper 20. In FIG. 13, the photoelectric conversion elements 65 are aligned in the main scanning direction parallel to the axial direction 46 of the roller 10 in a state where the end of each of the photoelectric conversion elements 65 is located at a distance A from the maximum roller load position 20a. When the roller 10 has a diameter of 20 mm, for example, the distance A is set equal to approximately 1 mm. The spacing member 80 of a substantially rectangular shape is positioned in a state where an end thereof extending in the main scanning direction is located at a distance B from the ends of the photoelectric conversion elements 65 which are closer to the maximum roller load position 20a. The distance B is equal to approximately 550 $\mu$m. The spacing member 80 has a thickness C of approximately 100 $\mu$m. A silicon nitride ($Si_3N_4$) film 71 is provided so as to coat the entire surfaces of the transparent wear-resistant layer 67 and the spacing member 80. The $Si_3N_4$ film 71 is approximately 5 $\mu$m in thickness, for example. When the above sizes are selected, a distance D of the air gap between the $Si_3N_4$ film 71 and the sheet of paper 20 is approximately 50 $\mu$m, and the MTF of a value of 0.55 is obtained. The spacing member 80 is a glass plate, for example. The glass plate 80 may be fixed to the transparent wear-resistant layer 67 by an adhesive material. Material used for the spacing member 80 is not limited to be optically transparent. The end of the spacing member 80 closer to the maximum roller load position 20a corresponds to the broken line 58 shown in FIG. 5.

Figure 14A:
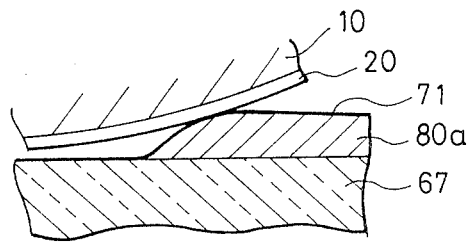
FIG. 14A is a cross sectional view showing a variation of a spacing member shown in FIG. 13.
Figure 14B:
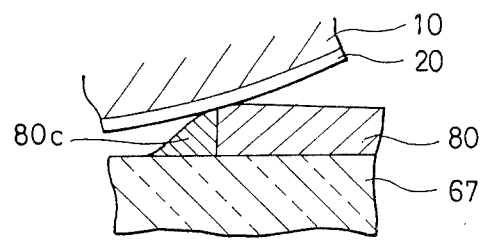
FIG. 14B is a cross sectional view showing another variation of the spacing member shown in FIG. 13.

It is preferable to give the spacing member 80 a tapered edge as shown in FIG. 14A. The tapered edge of a spacing member 80a facilitates a smooth sliding of the sheet thereon. As shown in FIG. 14B, the tapered edge is also obtained by depositing an adhesive material 80c on the side wall of the spacing member 80 so as to form a slope connected between the upper edge of the spacing member 80 and the surface of the transparent wear-resistant layer 67.

Figure 15:
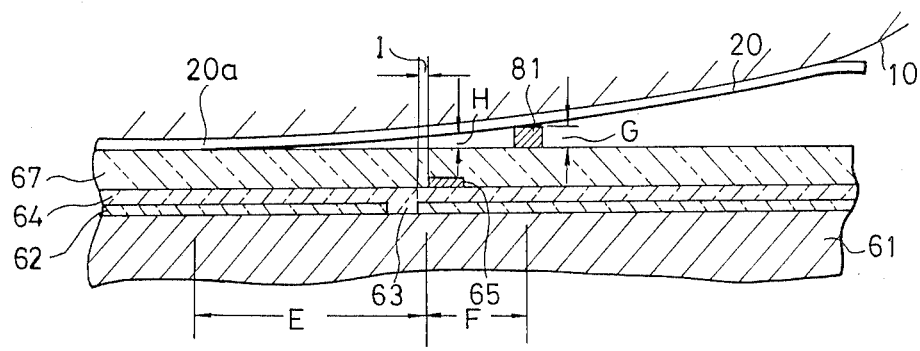
FIG. 15 is a cross sectional view of an essential part of a seventh embodiment of the present invention.

FIG. 15 is a seventh embodiment of the image sensor according to the present invention. A feature of the seventh embodiment is to use a spacing member 81 made of polyimide in place of the spacing member 80 made of glass. In FIG. 15, the photoelectric conversion elements 65 are aligned in the main scanning direction in a state where ends of the photoelectric conversion elements 65 are positioned at a distance E of approximately 0.7 mm from the maximum roller load position. The spacing member 81 made of polyimide (hereafter referred to as a polyimide member) is positioned at a distance F of approximately 0.3 mm in the sub-scanning direction from the ends of the photoelectric conversion elements 65. The polyimide member 81 extends in the main scanning direction. The polyimide member 81 can be formed by depositing polyimide on the entire surface of the transparent wear-resistant layer 67 by use of the photolithography technology and then carrying out etching for the deposited polyimide layer so as to obtain the polyimide member 81. When a thickness H of the air layer between the image sensor and the sheet of paper 20 is 20 $\mu$m, and a distance I between an end of the transparent window 63 and the ends of the photoelectric conversion elements 65 is 5 $\mu$m, a theoretical value of the MTF is equal to 0.6, and a measured value of the MTF is 0.55. The height G of the polyimide member 81 can be precisely controlled, and therefore the thickness H of the air layer can be precisely selected in a range of 10 to 50 $\mu$m. On the other hand, when the air layer of a thickness of 50 to 100 $\mu$m is desired, it is preferable to use the glass plate 80 shown in FIG. 13.

A description is given of an example of an optical reader applicable with the above embodiments of image sensor according to the present invention.

Figure 16:
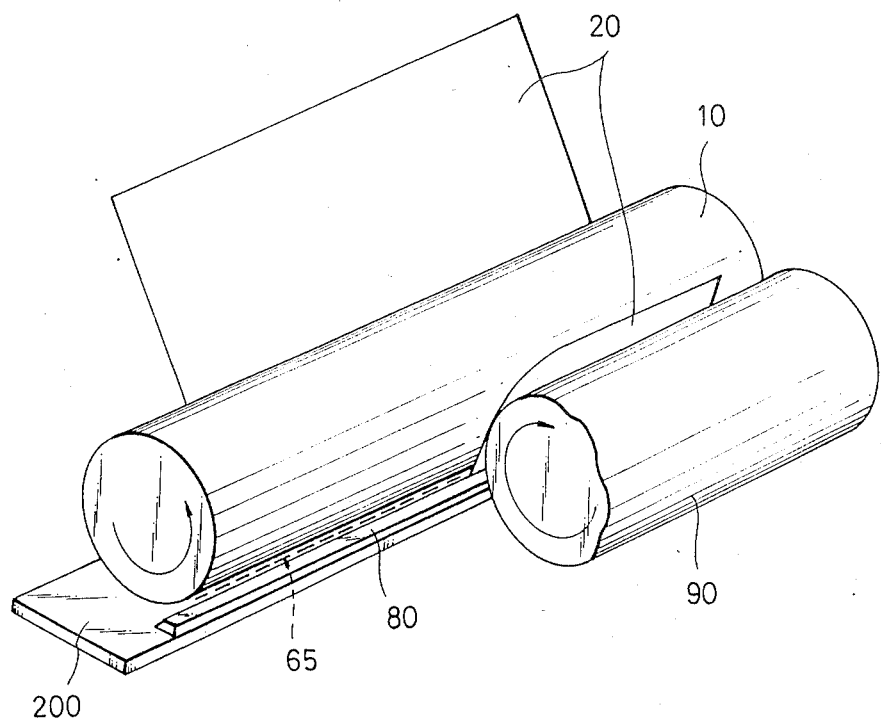
FIG. 16 is a perspective view of an embodiment of an optical reader according to the present invention.
Figure 17:
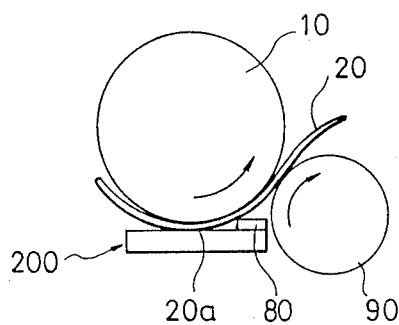
FIG. 17 is a side view of the optical reader of FIG. 16.

FIG. 16 is a perspective view of an example of an optical reader according to the present invention, and FIG. 17 is a side view of the optical reader of FIG. 16. In FIGS. 16 and 17, an image sensor 200 having the same structure as that shown in FIG. 13 is illustrated. A feature of the illustrated optical reader is the presence of a paper drawing roller 90. As described previously, the spacing member 80 or 81 is provided in order to certainly obtain the air layer between the top surface of the image sensor and the paper 20 and thus keep the distance therebetween constant. The paper drawing roller 90 is used for more certainly obtaining the air layer. The paper drawing roller 90 cooperates with the paper feed roller 10 so that the paper 20 is guided therebetween. As shown in FIG. 17, the roller 10 and 90 rotate in the opposite directions. The peripheral speed of the roller 90 is equal to or greater than the speed of the roller 10. The presence of the paper drawing roller 90 makes it possible to effectively prevent the paper 20 from sagging downwards above the surface of the image sensor 200. That is, the paper 20 makes total contact with the peripheral surface of the roller 10 in a range between the maximum roller load position 20a and the edge of the spacing member 80. As a result, the air layer 40 can be formed with certainty between the paper 20 and the surface portion above the transparent window 63 and the photoelectric conversion elements 65 of the image sensor 200. If the paper sags downwards and is brought into contact with the top surface of the image sensor, the portion of the surface of the $Si_3N_4$ film 71 above the window 63 and the elements 65 may be damaged or worn away. These problems lead to the degradation of the resolution of the image sensor. The presence of the roller 90 can effectively avoid the occurrence of the above problems.

The optical reader employing the paper drawing roller 90 is suitable for not only the image sensor 200 having the structure of FIG. 13 but also the other image sensors shown in FIGS. 7, 9, 10, 11A, 11B, 12, 14A, 14B and 15.

Figure 18:
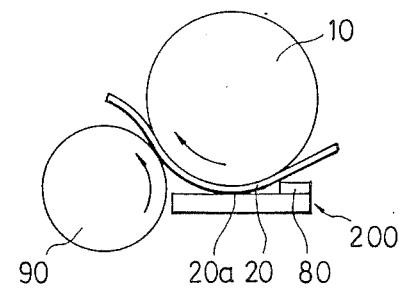
FIG. 18 is a perspective view of another embodiment of an optical reader according to the present invention.

FIG. 18 shows another embodiment of the optical reader according to the present invention. The structure of FIG. 17 and the structure of FIG. 18 differ from each other in the following way. Firstly, the paper drawing roller 90 is located on the side opposite to the position of the roller 90 shown in FIG. 17. The paper drawing roller 90 rotates counterclockwise, and the paper feed roller 10 rotates clockwise. The paper is transported in the direction opposite to the direction in FIG. 17.

Figure 19:
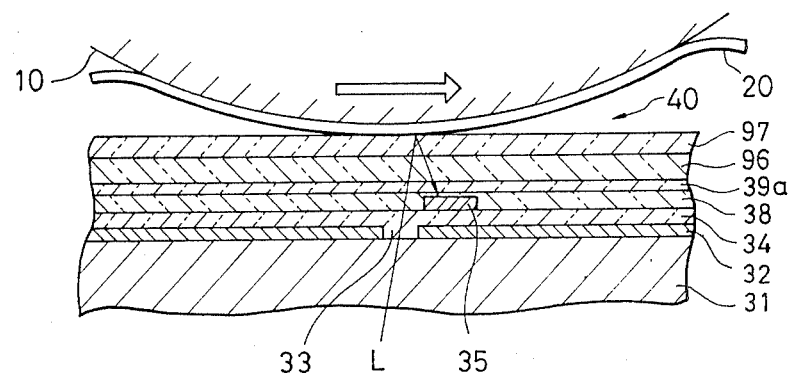
FIG. 19 is a cross sectional view of an eighth embodiment of the present invention.

A description is given of an embodiment of an image sensor according to the present in which refractive indexes of layers forming the image sensor are suitably selected, by referring to FIG. 19.

Figure 2:
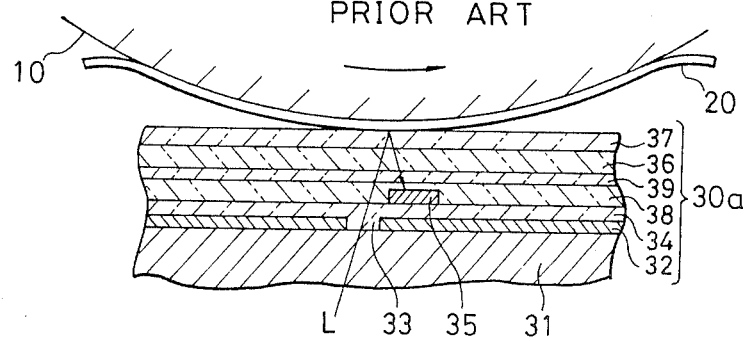
FIG. 2 is a cross sectional view an essential part of another conventional total contact type photoelectric conversion device together with the part of the roller.
Figure 3:
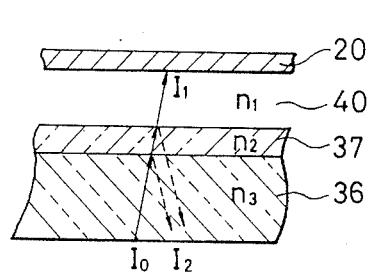
FIG. 3 is a cross sectional view for explaining a problem due to a great difference between a top layer of the conventional photoelectric conversion device shown in FIG. 2 and a air layer.
Figure 4:
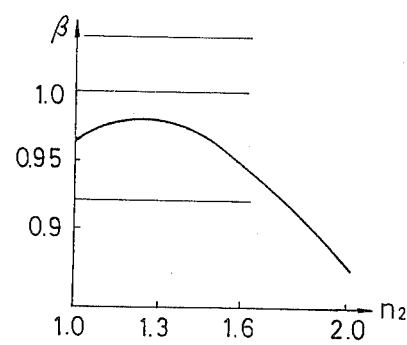
FIG. 4 is a graph showing a ratio of the quality of an incident light on the sheet of paper to the quality of an incident light on the device vs. the refractive index of the top layer of the device which is a wear-resistant layer.

The layer structure of FIG. 19 is similar to that of FIG. 2 except for the selection of the refractive indexes of a transparent protecting layer 96 and a transparent wear-resistant layer 97. According to the layer structure of FIG. 19, the refractive index $n_2$ of the transparent wear-resistant layer 97 and the refractive index $n_3$ of the transparent protecting layer 96 are selected so as to satisfy the following conditional expression by selecting suitable material:

$$|n_2-(n_1+n_3)/2| \leq 0.2$$

where $n_1$ denotes the refractive index of the air layer 40. The above conditional expression establishes a condition such that the average value of the refractive index $n_1$ of the air space 40 and the refractive index $n_3$ of the transparent protecting layer 96 is selected to be nearly equal to the refractive value $n_2$ of the transparent wear-resistant layer 97.

In order to satisfy the above conditional expression, the transparent wear-resistant layer 97 is made of a thin film comprising boron (B), carbon (C), nitrogen (N) and hydrogen (H), and the transparent protecting layer 96 is formed with the glass plate. The thin film 97 comprising B, C, N and H (hereafter referred to as a B-C-N-H film) can be formed by the plasma CVD where the mixture gas of diborane ($B_2H_6$), methane ($CH_4$) and nitrogen ($N_2$) is used. The mole ratio of C, N, and B (C:N:B) is approximately 8:3:1, and the other components are hydrogen (H) and oxygen (0). These components can be deposited at room temperature. The B-C-N-H film 97 has a refractive index of 1.3 and is transparent and hard. The image sensor employing the B-C-N-H film 97 can result in the MTF value of 0.62. On the other hand, the image sensor employing the $Si_3N_4$ film as the transparent wear-resistant layer 97 has a value of the MTF of 0.5 at the maximum.

In order to further improve the MTF of the embodiment of FIG. 7, materials for the transparent protecting layer 66 and the transparent wear-resistant layer 67 are selected so that the refractive indexes thereof satisfy the above conditional expression. Likewise, in order to further improve the MTF of the embodiment of FIG. 11B, materials for the transparent passivation layer 68a and the transparent wear-resistant layer 67d are selected so that the refractive indexes thereof satisfy the above conditional expression. In a case where the transparent wear-resistant layer 67d is the B-C-N-H film ($n_2=1.3$) and the transparent passivation layer 68a is made of $Si_3N_4$ ($n_3=2.0$), a value of the MTF of 0.65 can be obtained.

The present invention is not limited to the above embodiments, but various variations and modifications may be made without departing from the scope of the present invention. For example, the the structure of the photoelectric conversion elements are not limited to the structure of FIG. 8. The present invention includes a photoelectric conversion element in which a driving circiut for driving the aligned photoelectric conversion elements are formed on a substrate common to the photoelectric conversion elements.

What is claimed is:

1. A total contact type photoelectric conversion device comprising;
   a substrate having an optically transparent portion;
   a plurality of photoelectric conversion elements formed in a line on the substrate; and
   a cover layer covering the plurality of the photoelectric conversion elements and having a roller load region within which the cover layer is to make contact with a sheet partially wrapped around a peripheral surface of a roller for feeding the sheet in a sub-scanning direction;
   the plurality of photoelectric conversion elements being aligned in a main scanning direction perpendicular to the sub-scanning direction and being located outside the roller load region, so that incident light passing through the devide is reflected on a position on the sheet outside the roller load region.

2. A total contact type photoelectric conversion device as claimed in claim 1, wherein the substrate comprises a transparent substrate, a light screening layer which is formed on the transparent substrate and has a window located outside the roller load region for passing through the incident light, and a transparent insulating layer formed on the light screening layer, and wherein the plurality of the photoelectric conversion elements are formed on the transparent insulating layer so as to be located outside the roller load region, and wherein the cover layer comprises a transparent protecting layer formed on the transparent insulating layer and the plurality of the photoelectric conversion elements, and a transparent wear-resistant layer formed on the transparent protecting layer.

3. A total contact type photoelectric conversion device as claimed in claim 1, wherein the substrate comprises a transparent substrate, a light screening layer which is formed on the transparent substrate and has a window located outside the roller load region for passing the incident light, and a transparent insulating layer formed on the light screening layer, and wherein the plurality of the photoelectric conversion elements are formed on the transparent insulating layer so as to be located outside the roller load region, and wherein the cover layer comprises a transparent wear-resistant layer formed on transparent insulating layer and the plurality of the photoelectric conversion elements.

4. A total contact type photoelectric conversion device as claimed in claim 1, wherein the substrate comprises a transparent substrate, a light screening layer which is formed on the transparent substrate and has a window located outside the roller load region for passing through the incident light, and a transparent insulating layer formed on the light screening layer, and wherein the plurality of the photoelectric conversion elements are formed on the transparent insulating layer so as to be located outside the roller load region, and wherein the cover layer comprises a resin layer formed on a part of a surface of the transparent insulating layer except for the other part of the surface above the window and the plurality of the photoelectric conversion elements, and transparent wear-resistant layer formed on the resin layer and the other part of the surface of the transparent insulating layer.

5. A total contact type photoelectric conversion device as claimed in claim 1, wherein the substrate comprises a transparent substrate, a light screening layer which is formed on the transparent substrate and has a window located outside the roller load region for passing through the incident light, and a transparent insulating layer formed on the light screening layer, and wherein the plurality of the photoelectric conversion elements are formed on the transparent insulating layer so as to be located outside the roller load region, and wherein the cover layer comprises a supporting member which is formed on the transparent substrate and is to make contact with the sheet, and a transparent passivation layer formed on the insulating layer so as to cover the plurality of the photoelectric conversion elements.

6. A total contact type photoelectric conversion device as claimed in claim 1, wherein an edge of the spacing member which makes contact with the sheet is provided with an adhesive material so that a slope is formed between top of the spacing member and the surface of the cover layer.

7. A total contact type photoelectric conversion device as claimed in claim 1, wherein the substrate comprises a transparent substrate, a light screening layer which is formed on the transparent substrate and has a window located outside the roller load region for passing through the incident light, and a transparent insulating layer formed on the light screening layer, and wherein the plurality of the photoelectric conversion elements are formed on the transparent insulating layer so as to be located outside the roller load region, and wherein the cover layer comprises an optically transparent passivation layer formed on the transparent insulating layer and the plurality of the photoelectric conversion elements, and a wear-resistant layer formed on a part of a surface of the transparent passivation layer except for the other part of the surface above the window and the plurality of the photoelectric conversion elements.

8. A total contact type photoelectric conversion device as claimed in claim 7, wherein the wear-resistant layer is made of one i-carbon which is carbon having the diamond structure and silicon carbide (SiC).

9. A total contact type photoelectric conversion device as claimed in claim 1, wherein said device further comprises a spacing member formed on top of the cover layer for supporting the sheet so as to prevent the sheet from sagging down.

10. A total contact type photoelectric conversion device as claimed in claim 9, wherein the spacing member is made of one of glass or polyimide.

11. A total contact type photoelectric conversion device as claimed in claim 9, wherein an edge of the spacing member which makes contact with the sheet is tapered.

12. A total contact type photoelectric conversion device comprising;
 a substrate having an optically transparent portion;
 a plurality of photoelectric conversion elements formed in a line on the substrate;
 a first cover layer for covering the plurality of photoelectric conversion elements; and
 a second cover layer deposited on the first cover layer;
 wherein the following conditional expression is satisfied;

$$|n_2 - (n_1 + n_3)/2| \leq 0.2$$

wherein $n_1$ denotes a refractive index of an air layer adjacent to the second cover layer, $n_2$ denotes a refractive index of the second cover layer, and $n_3$ denotes a refractive layer of the first cover layer.

13. A total contact type photoelectric conversion device as claimed in claim 12, wherein the first cover layer is a film containing boron (B), carbon (C), nitrogen (N) and hydrogen (H).

14. An optical reader comprising;
 a total contact type photoelectric conversion device;
 a first roller for feeding a sheet on the photoelectric conversion device; and
 a second roller located so as to make contact with the first roller for drawing the sheet in a sheet transporting direction;
 the photoelectric conversion device comprising;
 a substrate having an optically transparent portion;
 a plurality of photoelectric conversion elements formed in a line on the substrate; and
 a cover layer covering the plurality of the photoelectric conversion elements and having a roller load region within which the cover layer is to make contact with the sheet partially wrapped around a peripheral surface of the first roller;
 the plurality of photoelectric conversion elements being aligned in a main scanning direction parallel to axes of the first and second rollers and being located outside the roller load region, so that incident light passing through the device is reflected on a position on the sheet outside the roller load region.

15. An optical reader as claimed in claim 14, wherein the rotating speed of the second roller is equal to or more than the rotating speed of the first roller.

16. An optical reader as claimed in claim 14, wherein said device further comprises a spacing member formed on top of the cover layer for supporting the sheet so as to prevent the sheet from sagging downwards.

17. An optical reader as claimed in claim 16, wherein the spacing member is made of one of glass or polyimide.

18. An optical reader as claimed in claim 16, wherein an edge of the spacing member which makes contact with the sheet is tapered.

* * * * *